(12) United States Patent
Hayashi et al.

(10) Patent No.: US 9,825,473 B2
(45) Date of Patent: Nov. 21, 2017

(54) CONTACTLESS POWER TRANSFER SYSTEM

(71) Applicants: Nippon Soken, Inc., Nishio-Shi (JP); Toyota Jidosha Kabushiki Kaisha, Toyota-shi, Aichi-ken (JP)

(72) Inventors: Yuji Hayashi, Kasugai (JP); Hiroaki Yuasa, Miyoshi (JP)

(73) Assignees: Toyota Jidosha Kabushiki Kaisha, Toyota-shi (JP); Nippon Soken, Inc., Nishio-shi (JP)

( * ) Notice: Subject to any disclaimer, the term of this patent is extended or adjusted under 35 U.S.C. 154(b) by 362 days.

(21) Appl. No.: 14/813,733

(22) Filed: Jul. 30, 2015

(65) Prior Publication Data

US 2016/0036243 A1 Feb. 4, 2016

(30) Foreign Application Priority Data

Aug. 4, 2014 (JP) .................. 2014-158560

(51) Int. Cl.
| | | |
|---|---|---|
| *H02J 5/00* | (2016.01) | |
| *H02J 50/80* | (2016.01) | |
| *B60L 11/18* | (2006.01) | |
| *H02J 7/02* | (2016.01) | |
| *H02J 50/10* | (2016.01) | |

(52) U.S. Cl.
CPC ............ *H02J 5/005* (2013.01); *B60L 11/1829* (2013.01); *H02J 7/025* (2013.01); *H02J 50/10* (2016.02); *H02J 50/80* (2016.02)

(58) Field of Classification Search
None
See application file for complete search history.

(56) References Cited

U.S. PATENT DOCUMENTS

| | | |
|---|---|---|
| 7,741,734 B2 | 6/2010 | Joannopoulos et al. |
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |

(Continued)

FOREIGN PATENT DOCUMENTS

| | | |
|---|---|---|
| AU | 2007349874 A1 | 10/2008 |
| AU | 2006269374 B2 | 10/2009 |

(Continued)

*Primary Examiner* — Jared Fureman
*Assistant Examiner* — James Evans
(74) *Attorney, Agent, or Firm* — Dinsmore & Shohl LLP

(57) ABSTRACT

A power supply ECU controls a converter to have a first control region in which a voltage is raised as a coupling coefficient is larger, and a second control region in which the voltage is maintained at a rating irrespective of a coupling coefficient. An ECU controls a converter such that an input impedance of the converter attains a prescribed value in the first control region and controls the converter such that received electric power becomes close to a target by changing the input impedance in the second control region.

7 Claims, 10 Drawing Sheets

(56) References Cited

U.S. PATENT DOCUMENTS

| | | |
|---|---|---|
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0181537 A1* | 7/2013 | Onizuka .................. H02J 5/005 307/104 |
| 2013/0193749 A1 | 8/2013 | Nakamura et al. |
| 2014/0175896 A1* | 6/2014 | Suzuki .................... H03H 7/40 307/104 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284A A1 | 10/2008 |
| CN | 101258658 A | 9/2008 |
| CN | 101682216 A | 3/2010 |
| CN | 101860089 A | 10/2010 |
| EP | 1902505A A2 | 3/2008 |
| EP | 2130287 A1 | 12/2009 |
| IN | 735/DELNP/2008 | 5/2008 |
| IN | 6195/DELNP/2009 | 7/2010 |
| JP | 2009-501510 T | 1/2009 |
| JP | 2011-045195 A | 3/2011 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2013-215066 A | 10/2013 |
| KR | 20080031398 A | 4/2008 |
| KR | 20100015954 A | 2/2010 |
| WO | 2007008646 A2 | 1/2007 |
| WO | 2008118178 A1 | 10/2008 |
| WO | 2013108108 A2 | 7/2013 |

* cited by examiner

CONTACTLESS POWER TRANSFER SYSTEM

This nonprovisional application is based on Japanese Patent Application No. 2014-158560 filed on Aug. 4, 2014, with the Japan Patent Office, the entire contents of which are hereby incorporated by reference.

BACKGROUND OF THE INVENTION

Field of the Invention

The present invention relates to a contactless power transfer system for transferring electric power from a power transmission device to a power reception device in a contactless manner.

Description of the Background Art

Japanese Patent Laying-Open No. 2013-215066 discloses a power transfer system for transferring electric power from a power transmission device to a power reception device in a contactless manner. In this power transfer system, the power reception device includes a power receiving-side resonator, a rectifier, a DC/DC converter, and a control device. Based on the input voltage of the DC/DC converter, the control device calculates a current command value at which the input impedance of the DC/DC converter is set at a set value, and then, controls the DC/DC converter such that the input current of the DC/DC converter becomes equal to the current command value.

According to this power transfer system, since the input impedance of the DC/DC converter is maintained constant during the operation period of the DC/DC converter, input impedance matching can always be achieved, so that power transfer efficiency can be improved (see Japanese Patent Laying-Open No. 2013-215066).

In the above-described power transfer system, the magnitude of the coupling coefficient between the power transmission device and the power reception device is not taken into consideration. In the case where the DC/DC converter is controlled so as to have an input impedance kept constant, if the coupling coefficient is relatively small, the power transmission voltage needs to be lowered in the power transmission device in order to ensure the desired power reception current (the input current of the DC/DC converter). In the case where prescribed electric power is transferred from the power transmission device to the power reception device, when a voltage is lowered in the power transmission device, the flowing current is increased. Consequently, loss is increased, so that the efficiency may entirely decrease.

SUMMARY OF THE INVENTION

The present invention has been made to solve the above-described problems. An object of the present invention is to provide a contactless power transfer system for transferring electric power from a power transmission device to a power reception device for the purpose of suppressing deterioration of the efficiency of the entire system when the coupling coefficient is relatively small.

According to the present invention, the contactless power transfer system includes a power transmission device and a power reception device. The power transmission device includes a power transmission unit, a voltage variable high-frequency power supply, and a first control unit. The power transmission unit includes a power transmission coil and a first capacitor connected in series to the power transmission coil, and is configured to transmit electric power to the power reception device in a contactless manner. The voltage variable high-frequency power supply is configured to supply alternating-current (AC) power to the power transmission unit while adjusting a voltage of the voltage variable high-frequency power supply. The first control unit controls the voltage variable high-frequency power supply. The power reception device includes a power reception unit, an impedance adjuster, and a second control unit. The power reception unit includes a power reception coil and a second capacitor connected to the power reception coil, and is configured to receive electric power from the power transmission unit in a contactless manner. The impedance adjuster is provided between the power reception unit and load equipment. The second control unit controls the impedance adjuster. The first control unit controls the voltage variable high-frequency power supply to include: a first control region in which a voltage of the voltage variable high-frequency power supply is raised as a coupling coefficient between the power transmission unit and the power reception unit is larger; and a second control region that is larger in coupling coefficient than the first control region and in which the voltage of the voltage variable high-frequency power supply is maintained at a constant value or substantially at the constant value irrespective of the coupling coefficient. The second control unit controls the impedance adjuster such that an input impedance of the impedance adjuster becomes equal to a prescribed value or substantially to the prescribed value when the voltage variable high-frequency power supply is controlled in the first control region, and controls the impedance adjuster such that received electric power becomes close to a target by changing the input impedance from the prescribed value or substantially from the prescribed value when the voltage variable high-frequency power supply is controlled in the second control region.

According to this contactless power transfer system, in the first control region, the larger the coupling coefficient is, the higher the voltage of the voltage variable high-frequency power supply is set. In the second control region, the voltage of the voltage variable high-frequency power supply is maintained at a constant value or substantially at the constant value irrespective of the coupling coefficient. Therefore, in the second control region, the received electric power can be controlled to be a target by changing the input impedance of the impedance adjuster from the prescribed value or substantially from the prescribed value. By providing such a second control region, the minimum voltage of the voltage variable high-frequency power supply in the first control region can be raised as compared with the case where the input impedance is always controlled to be constant. By raising the voltage of the voltage variable high-frequency power supply, the flowing current is suppressed, so that loss is suppressed. Therefore, according to this contactless power transfer system, it becomes possible to suppress deterioration of the efficiency of the entire system when the coupling coefficient is relatively small.

Preferably, the second capacitor is connected in series to the power reception coil. The second control unit controls the impedance adjuster such that the input impedance of the impedance adjuster becomes greater than the prescribed value when the voltage variable high-frequency power supply is controlled in the second control region.

In the configuration in which the second capacitor is connected in series to the power reception coil, the impedance adjuster is controlled in the second control region such that the input impedance of the impedance adjuster becomes greater than the prescribed value, so that the minimum voltage of the voltage variable high-frequency power supply in the first control region can be raised while ensuring the desired received electric power in the power reception device. Therefore, according to this contactless power transfer system, it becomes possible to suppress deterioration of the efficiency of the entire system when the coupling coefficient is relatively small.

Furthermore, preferably, the second capacitor is connected in parallel with the power reception coil. The second control unit controls the impedance adjuster such that the input impedance of the impedance adjuster becomes smaller than the prescribed value when the voltage variable high-frequency power supply is controlled in the second control region.

In the configuration in which the second capacitor is connected in parallel with the power reception coil, the impedance adjuster is controlled in the second control region such that the input impedance of the impedance adjuster becomes smaller than the prescribed value, so that the minimum voltage of the voltage variable high-frequency power supply in the first control region can be raised while ensuring the desired received electric power in the power reception device. Therefore, according to this contactless power transfer system, it becomes possible to suppress deterioration of the efficiency of the entire system when the coupling coefficient is relatively small.

Preferably, the power reception device further includes a rectifier configured to rectify AC power received by the power reception unit. The impedance adjuster is a first converter provided between the rectifier and the load equipment.

In this contactless power transfer system, the converter provided between the rectifier and the load equipment is employed as an impedance adjuster. Accordingly, the impedance adjuster does not have to be provided separately from the converter. Therefore, this contactless power transfer system can suppress the increase in number of devices mounted in the power reception device.

Preferably, the prescribed value is set based on a rated current of the power reception device.

By providing such a configuration, it becomes possible to suppress deterioration of the efficiency of the entire system at a relatively small coupling coefficient while suppressing the current received by the power reception device to be equal to or less than the rated current.

Furthermore, preferably, the prescribed value is set at an input impedance at which maximum transfer efficiency is implemented when the coupling coefficient is a prescribed minimum value.

By providing such a configuration, the input impedance can be changed appropriately in accordance with the change in the coupling coefficient while maintaining high transfer efficiency.

Preferably, the voltage variable high-frequency power supply includes an inverter connected to the power transmission unit and a second converter configured to adjust an input voltage of the inverter. The first control unit controls the second converter such that the inverter input voltage is raised as the coupling coefficient is larger in the first control region, and controls the second converter such that the inverter input voltage is maintained at a rated voltage of the inverter or substantially at the rated voltage thereof irrespective of the coupling coefficient in the second control region. The voltage of the voltage variable high-frequency power supply is the input voltage of the inverter. The first control unit maintains the voltage of the voltage variable high-frequency power supply at the constant value or substantially at the constant value by maintaining the inverter input voltage at the rated voltage of the inverter or substantially at the rated voltage thereof.

By providing such a configuration, the inverter input voltage in the first control region can be raised as compared with the case where the input impedance is always controlled to be constant. The inverter input voltage is raised, so that loss in the inverter is suppressed. Therefore, according to this contactless power transfer system, it becomes possible to suppress deterioration of the efficiency of the entire system when the coupling coefficient is relatively small.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be hereinafter described in detail with reference to the accompany-

First Embodiment (Configuration of Contactless Power Transfer System)

Figure 1:
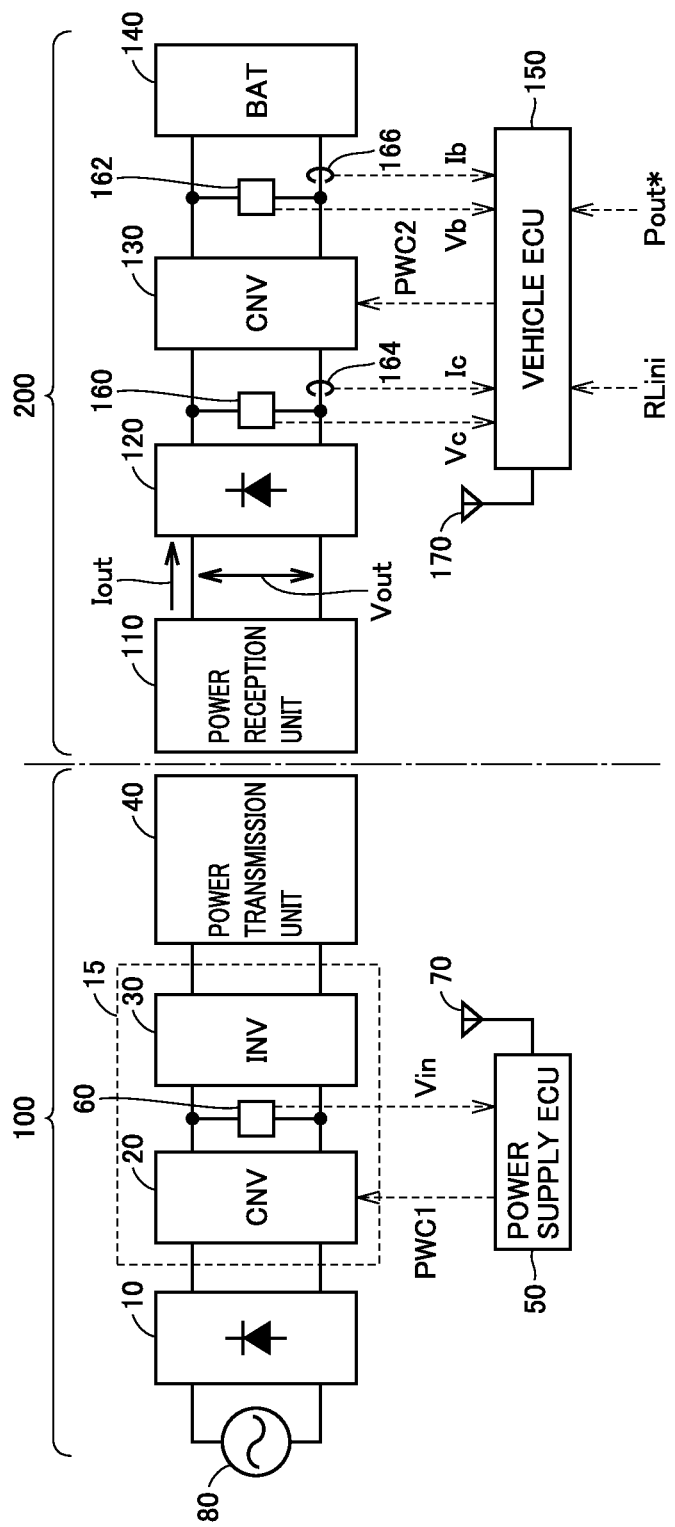
FIG. 1 is an entire configuration diagram of a contactless power transfer system according to the first embodiment of the present invention.

FIG. 1 is an entire configuration diagram of a contactless power transfer system according to the first embodiment of the present invention. Referring to FIG. 1, the contactless power transfer system includes a power transmission device 100 and a power reception device 200 that is mounted in a vehicle. Power transmission device 100 is provided external to the vehicle, and can charge a power storage device 140 mounted in the vehicle (charging of power storage device 140 in the vehicle by power transmission device 100 provided external to the vehicle will also be hereinafter referred to as "external charging").

Power transmission device 100 includes a rectifier 10, a voltage variable high-frequency power supply 15, a power transmission unit 40, a power supply ECU (Electronic Control Unit) 50, a voltage sensor 60, and a communication device 70. Rectifier 10 rectifies AC power received from an external power supply 80 such as a commercial system power supply, and outputs the rectified power to voltage variable high-frequency power supply 15. In the case where external power supply 80 is a DC (direct-current) power supply, rectifier 10 does not have to be provided.

Voltage variable high-frequency power supply 15 generates AC power having a prescribed transmission frequency, adjusts the voltage of the generated AC power, and outputs the adjusted voltage to power transmission unit 40. By way of example, in the contactless power transfer system according to the present first embodiment, voltage variable high-frequency power supply 15 includes a converter 20 and an inverter 30.

Converter 20 is provided between rectifier 10 and inverter 30, and adjusts the voltage supplied to inverter 30 (an input voltage of inverter 30) based on a control signal PWC1 received from power supply ECU 50. Converter 20 is formed of a boost chopper circuit, for example.

Inverter 30 is connected between converter 20 and power transmission unit 40. Inverter 30 converts the DC power obtained by voltage adjustment by converter 20 into AC power having a prescribed transmission frequency, and supplies the converted AC power to power transmission unit 40. Inverter 30 is formed of a single-phase full bridge circuit, for example. Voltage sensor 60 detects the voltage adjusted by converter 20, that is, a voltage Vin supplied to inverter 30, and outputs the detected value to power supply ECU 50.

Power transmission unit 40 includes a resonance circuit (a coil and a capacitor) for transmitting electric power to power reception unit 110 of power reception device 200 in a contactless manner. When power transmission unit 40 receives AC power having a transmission frequency from inverter 30, it generates an electromagnetic field around power transmission unit 40. Power transmission unit 40 transmits electric power through the generated electromagnetic field to power reception unit 110 of power reception device 200 in a contactless manner. The specific configuration of power transmission unit 40 will be described later together with power reception unit 110.

Power supply ECU 50 includes a CPU, a storage device, an input/output buffer, and the like (each of which is not shown), and performs various types of control in power transmission device 100. As main control of power supply ECU 50 according to the present invention, during execution of external charging by power transmission device 100, power supply ECU 50 generates control signal PWC1 for adjusting voltage Vin by converter 20 and outputs the generated control signal PWC1 to converter 20. Specific control for converter 20 associated with external charging will be described later in detail.

Furthermore, power supply ECU 50 determines whether voltage Vin detected by voltage sensor 60 has reached a rated voltage (the upper limit voltage) of inverter 30 or not, and controls communication device 70 to transmit the determination result to power reception device 200. The detected value of voltage Vin may be transmitted to power reception device 200 by means of communication device 70, and it may be determined in power reception device 200 whether voltage Vin has reached the rated voltage or not.

On the other hand, power reception device 200 includes a power storage device (load equipment) 140, a power reception unit 110, a rectifier 120, a converter 130, and an ECU 150. Furthermore, power reception device 200 includes voltage sensors 160, 162, current sensors 164, 166, and a communication device 170.

Power reception unit 110 includes a resonance circuit (a coil and a capacitor) for receiving electric power from power transmission unit 40 of power transmission device 100 in a contactless manner. Power reception unit 110 receives electric power from power transmission unit 40 in a contactless manner through the electromagnetic field generated around power transmission unit 40. Power reception unit 110 is disposed, for example, in the lower part of the vehicle body located relatively close to the front side thereof, and receives electric power from power transmission unit 40 that is disposed on the surface of the ground or in the ground.

Rectifier 120 rectifies the AC power received by power reception unit 110 and outputs the rectified power to converter 130. Converter 130 is provided between rectifier 120 and power storage device 140 corresponding to load equipment, and adjusts the input impedance of converter 130 based on a control signal PWC2 received from ECU 150. Specifically, converter 130 adjusts the input impedance by adjusting a voltage Vc input into converter 130. This adjustment of the input impedance by converter 130 will be described later in detail.

Power storage device 140 is a rechargeable DC power supply and is configured of a secondary battery such as a lithium-ion battery or a nickel-metal hydride battery, for example. Power storage device 140 is charged by receiving electric power received by power reception unit 110. The electric power stored in power storage device 140 is supplied to a vehicle drive device, auxiliary machinery and the like that are not shown. In addition, power storage device 140 may be configured by a power storage element such as an electric double layer capacitor in place of a secondary battery.

Voltage sensor 160 detects voltage Vc input into converter 130, and outputs the detected value to ECU 150. Current sensor 164 detects a current Ic input into converter 130, and outputs the detected value to ECU 150. Voltage sensor 162 detects the output voltage of converter 130, that is, a voltage Vb of power storage device 140, and outputs the detected value to ECU 150. Current sensor 166 detects the current supplied from converter 130 to the power storage device, that is, a current Ib showing the charging current for power storage device 140, and outputs the detected value to ECU 150.

ECU 150 includes a CPU, a storage device, an input/output buffer, and the like (each of which is not shown), and performs various types of control in power reception device 200. As main control of ECU 150 according to the present invention, ECU 150 performs external charging control for carrying out external charging for the purpose of charging power storage device 140 by means of power transmission device 100. During execution of external charging control, ECU 150 generates control signal PWC2 for adjusting the input impedance of converter 130, and outputs the generated control signal PWC2 to converter 130. Furthermore, ECU 150 determines whether charge power Pout of power storage device 140 has reached a charge power command value Pout* or not, and controls communication device 170 to transmit the determination result to power transmission device 100. The details of external charging control will be described later.

Figure 2:
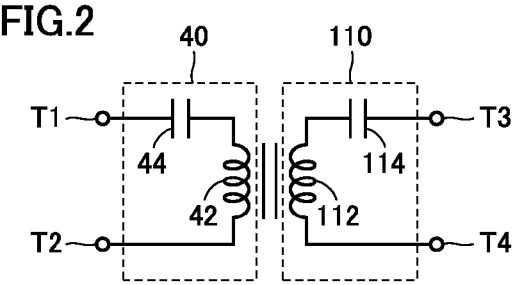
FIG. 2 is a diagram showing the circuit configuration of a power transmission unit and a power reception unit shown in FIG. 1.

FIG. 2 is a diagram showing the circuit configuration of power transmission unit 40 and power reception unit 110 shown in FIG. 1. Referring to FIG. 2, power transmission unit 40 includes a coil 42 and a capacitor 44. Capacitor 44 is connected in series to coil 42 and forms a resonance circuit together with coil 102. Capacitor 44 is provided for adjusting the resonance frequency of power transmission unit 40. Power reception unit 110 includes a coil 112 and a capacitor 114. Capacitor 114 is connected in series to coil 112 and forms a resonance circuit together with coil 112. Capacitor 114 is provided for adjusting the resonance frequency of power reception unit 110. Power transmission unit 40 and power reception unit 110 are designed to resonate each other in transmission frequency of the electric power transmitted from power transmission unit 40 to power reception unit 110. It is preferable that a Q factor showing the resonance strength of power transmission unit 40 and power reception unit 110 is equal to or greater than 100.

Figure 3:
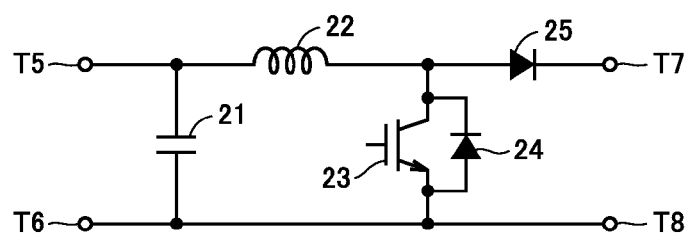
FIG. 3 is a diagram showing an example of the circuit configuration of a converter shown in FIG. 1.

FIG. 3 is a diagram showing an example of the circuit configuration of converter 20 shown in FIG. 1. Converter 130 of power reception device 200 also has the circuit configuration similar to that of converter 20. Referring to FIG. 3, converter 20 includes a capacitor 21, a coil 22, a switching element 23, a diode 24 connected in anti-parallel to switching element 23, and a diode 25. Each of these elements forms a boost chopper circuit. The duty ratio of switching element 23 is controlled by power supply ECU 50 (FIG. 1). Converter 20 can adjust the voltage between terminals T7 and T8 to be equal to or greater than the voltage between terminals T5 and T6 in accordance with the duty ratio of switching element 23.

(Description of External Charging Control)

Again referring to FIG. 1, in this contactless power transfer system, during execution of external charging, converter 20 is controlled in power transmission device 100 and converter 130 is controlled in power reception device 200 such that charge power Pout of power storage device 140 becomes equal to desired charge power command value Pout*.

In this case, in accordance with the parking position of the vehicle relative to power transmission device 100, the relative positional relation between power transmission unit 40 of power transmission device 100 and power reception unit 110 of power reception device 200 changes, and a coupling coefficient k between power transmission unit 40 and power reception unit 110 changes. In the contactless power transfer system according to the present first embodiment, external charging control is carried out differently between the first control region in which coupling coefficient k is relatively small and the second control region in which coupling coefficient k is relatively large, which will be hereinafter described.

In the contactless power transfer system according to the present first embodiment, the so-called "SS (Series-Series) system" configuration is employed, in which capacitor 44 is connected in series to coil 42 in power transmission unit 40 while capacitor 114 is connected in series to coil 112 also in power reception unit 110, as shown in FIG. 2. Such an SS system circuit has immittance characteristics, in which case a current Iout of power reception unit 110 is proportional to the voltage of power transmission unit 40. Furthermore, under the condition that the electric power transmitted from power transmission unit 40 to power reception unit 110 is controlled to be constant, voltage Vout of power reception unit 110 is increased as coupling coefficient k between power transmission unit 40 and power reception unit 110 is larger. Accordingly, current Iout of power reception unit 110 is decreased. As the magnitude of the voltage on power transmission unit 40 is adjusted in accordance with voltage Vin, the following relation lies among current Iout of power reception unit 110, voltage Vin adjusted in power transmission device 100 and coupling coefficient k based on the above description.

$$Iout = \alpha1(Vin/k) \tag{1}$$

In this case, α1 is a constant. As apparent from the equation (1), when coupling coefficient k is relatively small, voltage Vin needs to be lowered in power transmission device 100 in order to obtain desired current Iout in power reception unit 110. On the other hand, when coupling coefficient k is relatively large, voltage Vin needs to be raised. However, the upper limit (rated voltage) determined by the breakdown voltage and the like of each element is set for voltage Vin. Accordingly, when voltage Vin is suppressed to the rated voltage even though coupling coefficient k is relatively large, desired current Iout may not be achieved.

Figure 4:
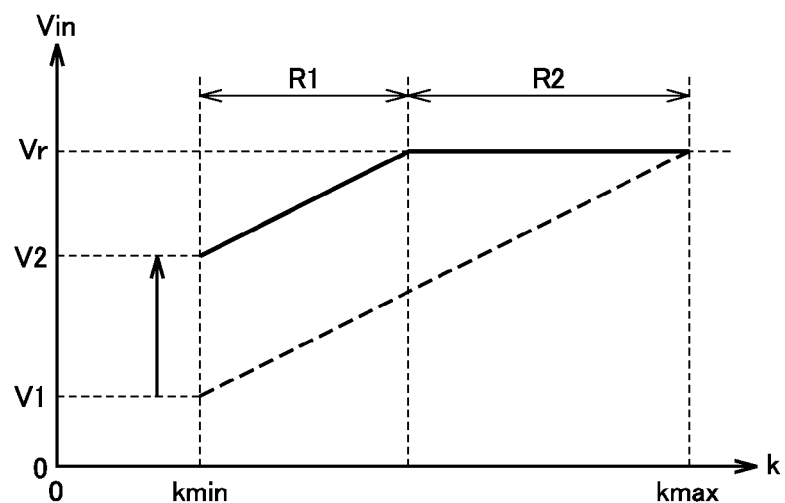
FIG. 4 is a diagram showing the relation between the coupling coefficient and the voltage in the power transmission device.
Figure 5:
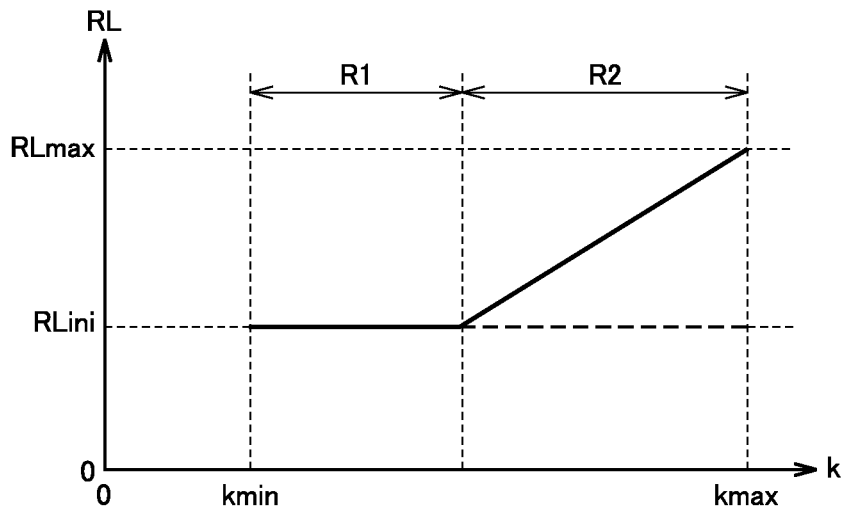
FIG. 5 is a diagram showing the relation between the coupling coefficient and the equivalent resistance of a load that receives received electric power.

FIG. 4 is a diagram showing the relation between coupling coefficient k and voltage Vin in power transmission device 100. Furthermore, FIG. 5 is a diagram showing the relation between coupling coefficient k and an equivalent resistance RL of the load that receives the received electric power. It is to be noted that the equivalent resistance is an impedance of the load formed of power storage device 140 and converter 130 of power reception device 200, and corresponds to the input impedance of converter 130. Equivalent resistance RL can be detected based on the input voltage and the input current of converter 130, and is adjusted by controlling converter 130.

Referring to FIGS. 4 and 5, solid lines show voltage Vin and equivalent resistance RL, respectively, in the contactless power transfer system according to the present first embodiment, while dotted lines show voltage Vin and equivalent resistance RL, respectively, in the conventional system as a reference example. First described will be the concept of the conventional setting of voltage Vin and equivalent resistance RL.

Conventionally, equivalent resistance RL is adjusted to a prescribed value RLini without taking coupling coefficient k into consideration (FIG. 5). As described above, when voltage Vin is suppressed to a rated voltage Vr in the case where coupling coefficient k is relatively large, desired current Iout may not be achieved. Conventionally, voltage Vin attains rated voltage Vr when coupling coefficient k is at the maximum (the power reception unit is located opposite to the power transmission unit), and voltage Vin is lowered as coupling coefficient k becomes smaller (the dotted line in FIG. 4). However, according to such setting of voltage Vin, voltage Vin is lowered when coupling coefficient k is relatively small, with the result that the current flowing through the power transmission device is increased, thereby increasing loss.

Thus, in the contactless power transfer system according to the present first embodiment, voltage Vin is raised as compared with the conventional case (the solid line in FIG. 4). When voltage Vin is raised, voltage Vin may reach rated voltage Vr in a range in which coupling coefficient k is smaller than maximum value kmax. When voltage Vin is limited to rated voltage Vr, current Iout lowers in the region where coupling coefficient k is relatively large, as apparent from the equation (1). Accordingly, in this first embodiment, in the region (R2) having coupling coefficient k at which voltage Vin reaches rated voltage Vr, equivalent resistance RL is adjusted by converter 130 such that equivalent resistance RL is increased as coupling coefficient k is larger (FIG. 5). Specifically, charge power Pout is expressed by Iout$^2$× RL. Accordingly, desired charge power Pout is ensured by increasing equivalent resistance RL in accordance with the decrease in current Iout by suppressing voltage Vin to rated voltage Vr. By providing such a configuration, voltage Vin can be raised in power transmission device 100 while achieving charge power Pout as indicated by charge power command value Pout*. Consequently, loss in power transmission device 100 can be reduced.

In addition, in the region (R1) having coupling coefficient k at which voltage Vin can be raised in accordance with coupling coefficient k, equivalent resistance RL is set at prescribed value RLini. This prescribed value RLini can be determined, for example, based on a rated current Ioutr of current Iout in power reception unit 110 by the following equation.

$$RLini = Pout^* / Ioutr^2 \quad (2)$$

By employing this prescribed value RLini, current Iout exceeding rated current Ioutr can be prevented from flowing into power reception unit 110.

Alternatively, prescribed value RLini may be determined based on equivalent resistance RL at which the maximum transfer efficiency is implemented at the time when coupling coefficient k attains a prescribed minimum value kmin.

Figure 6:
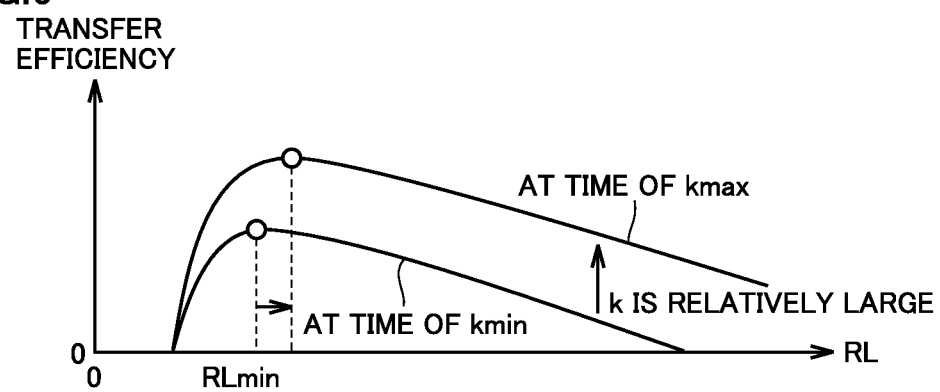
FIG. 6 is a diagram showing the relation between the equivalent resistance and the transfer efficiency from the power transmission unit to the power reception unit.

FIG. 6 is a diagram showing the relation between equivalent resistance RL and transfer efficiency η from power transmission unit 40 to power reception unit 110. Referring to FIG. 6, the larger coupling coefficient k is, the more transfer efficiency η is increased. Furthermore, the larger coupling coefficient k is, the more equivalent resistance RL allowing implementation of the maximum transfer efficiency η is increased. Thus, as shown in FIG. 5, in the contactless power transfer system according to this first embodiment, in consideration of the fact that equivalent resistance RL is increased as coupling coefficient k is larger in region R2, equivalent resistance RL allowing implementation of the maximum transfer efficiency when coupling coefficient k attains prescribed minimum value kmin is set at prescribed value RLini. In this case, in region R2, equivalent resistance RL can be changed such that equivalent resistance RL becomes larger than prescribed value RLini as coupling coefficient k is larger.

Again referring to FIG. 1, function sharing between ECU 150 and power supply ECU 50 during external charging control will be hereinafter described. Charge power Pout supplied to power storage device 140 is managed in ECU 150 based on voltage Vb and current Ib. At the beginning of start of external charging, ECU 150 sends a power-transmission command to power supply ECU 50 such that charge power Pout becomes equal to charge power command value Pout*. Power supply ECU 50 controls converter 20 based on the power-transmission command, and converter 20 adjusts voltage Vin. In other words, power supply ECU 50 controls voltage Vin such that charge power Pout becomes equal to charge power command value Pout*. On the power reception device 200 side, ECU 150 controls converter 130 such that equivalent resistance RL (the input impedance of converter 130) attains prescribed value RLini or substantially prescribed value RLini. The expression of "substantially prescribed value RLini" means a value obtained at the time when the impedance varies inevitably in the case where equivalent resistance RL is controlled to be maintained at "prescribed value RLini".

If coupling coefficient k between power transmission unit 40 and power reception unit 110 is relatively small, charge power Pout is controlled by converter 20 variably controlling voltage Vin in power transmission device 100. On the other hand, if coupling coefficient k is relatively large, voltage Vin is to reach rated voltage Vr. When voltage Vin has reached rated voltage Vr, power supply ECU 50 controls converter 130 to maintain voltage Vin at rated voltage Vr, and also notifies ECU 150 that voltage Vin has reached rated voltage Vr.

When ECU 150 receives the notification from power transmission device 100 that voltage Vin has reached rated voltage Vr in power transmission device 100, it controls converter 130 in the direction in which equivalent resistance RL is increased such that charge power Pout becomes equal to charge power command value Pout*. Specifically, when voltage Vin is saturated in power transmission device 100 due to a relatively large coupling coefficient k, ECU 150 then comes to take charge of controlling charge power Pout. Then, ECU 150 adjusts equivalent resistance RL to thereby control charge power Pout.

In control region R1 in which coupling coefficient k is relatively small, thus, in power transmission device 100, voltage Vin of inverter 30 is controlled by converter 20 to be increased as coupling coefficient k is larger; and in power reception device 200, equivalent resistance RL is maintained by converter 130 at prescribed value RLini or substantially at prescribed value RLini.

In control region R2 that is larger in coupling coefficient k than control region R1, on the other hand, in power transmission device 100, voltage Vin is maintained at rated voltage Vr or substantially at rated voltage Vr; and in power reception device 200, equivalent resistance RL is adjusted to a value greater than prescribed value RLini by converter 130. By providing such a configuration, the minimum value of voltage Vin in power transmission device 100 can be raised as compared with the conventional case, and the current flowing through power transmission device 100 is reduced so that loss can be suppressed.

In this case, the term "substantially at rated voltage Vr" means a value obtained when voltage Vin varies inevitably even when this voltage Vin is controlled to be maintained at rated voltage Vr.

Although an explanation has been given in the above description with regard to the example focusing on the input voltage of inverter 30 as an example of the "voltage of the voltage variable high-frequency power supply", the "voltage of the voltage variable high-frequency power supply" may for example be an output voltage of inverter 30 or may be an output voltage of converter 20.

Figure 7:
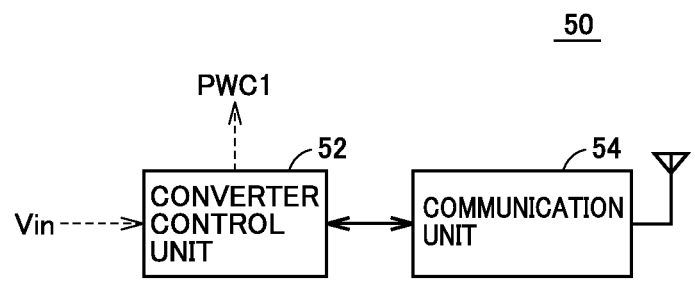
FIG. 7 is a functional block diagram of a power supply ECU shown in FIG. 1.

FIG. 7 is a functional block diagram of power supply ECU 50 shown in FIG. 1. Referring to FIG. 7, power supply ECU 50 includes a converter control unit 52 and a communication unit 54. Converter control unit 52 receives information about a deviation ΔP of the charge power (the difference with charge power command value Pout*) through communication unit 54 from power reception device 200. This information may be the value itself of deviation ΔP or may be the symbol or the like of deviation ΔP.

Then, converter control unit 52 generates control signal PWC1 for adjusting voltage Vin to reduce deviation ΔP based on the information about deviation ΔP, and outputs the generated control signal PWC1 to converter 20. Furthermore, when voltage Vin detected by voltage sensor 60 reaches rated voltage Vr, converter control unit 52 notifies power reception device 200 through communication unit 54 that voltage Vin has reached rated voltage Vr.

Figure 8:
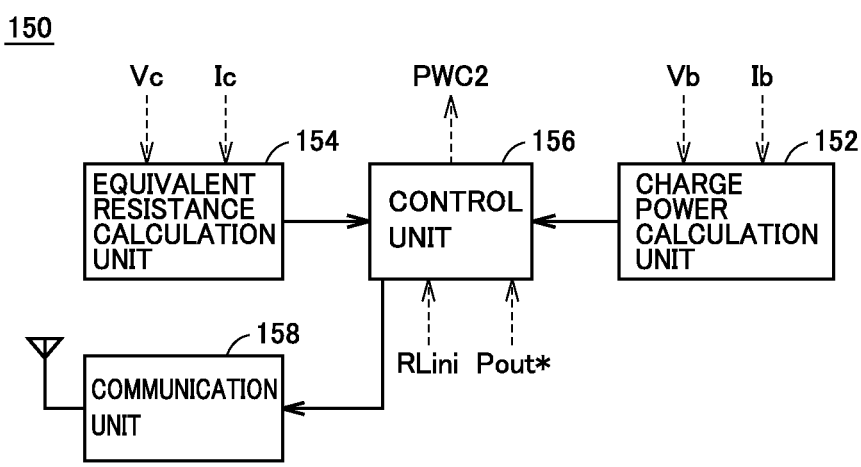
FIG. 8 is a control block diagram of an ECU shown in FIG. 1.

FIG. 8 is a control block diagram of ECU 150 shown in FIG. 1. Referring to FIG. 8, ECU 150 includes a charge power calculation unit 152, an equivalent resistance calculation unit 154, a control unit 156, and a communication unit 158.

Charge power calculation unit 152 calculates charge power Pout of power storage device 140 based on the detected value of each of voltage Vb and current Ib, and outputs the calculated value to control unit 156. Equivalent resistance calculation unit 154 calculates equivalent resistance RL (the input impedance of converter 130) by dividing the detected value of voltage Vc by the detected value of current Ic, and outputs the calculated value to control unit 156.

Control unit 156 calculates deviation ΔP between charge power command value Pout* and charge power Pout, and transmits the information about deviation ΔP to power transmission device 100 by means of communication unit 158. Furthermore, control unit 156 receives the voltage information of power transmission device 100 from power transmission device 100 by means of communication unit 158. This voltage information includes the information showing whether voltage Vin has reached rated voltage Vr or not in power transmission device 100. Then, control unit 156 generates control signal PWC2 for controlling converter 130 based on charge power Pout and its command value Pout*, equivalent resistance RL and its prescribed value RLini, and the voltage information about voltage Vin from power transmission device 100.

Figure 9:
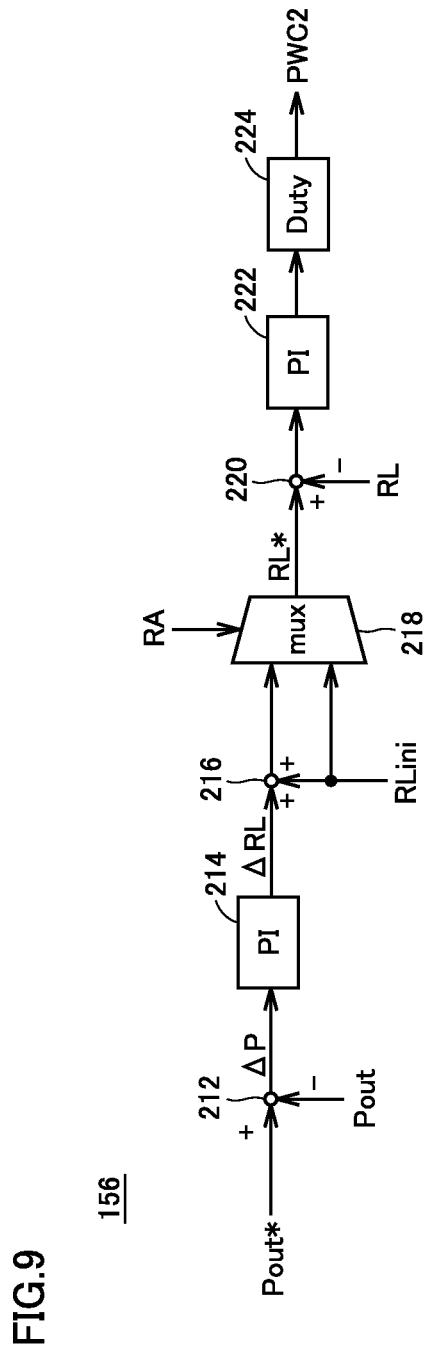
FIG. 9 is a control block diagram of a control unit shown in FIG. 8.

FIG. 9 is a control block diagram of control unit 156 shown in FIG. 8. Referring to FIG. 9, a subtraction unit 212 subtracts charge power Pout (actual value) from charge power command value Pout*, and outputs the calculation result to a PI control unit 214 as ΔP. PI control unit 214 performs proportional and integral calculation using deviation ΔP calculated by subtraction unit 212 as an input, and outputs the calculation result to an addition unit 216 as a correction amount ΔRL of the equivalent resistance.

Addition unit 216 adds correction amount ΔRL to a prescribed value RLini of the equivalent resistance, and outputs the calculation result to multiplexer 218. Multiplexer 218 receives the output of addition unit 216 and prescribed value RLini each as an input, and receives a signal RA as a selection signal. Signal RA is a signal received from power transmission device 100 and showing the voltage information about voltage Vin. Also, this signal RA is activated when voltage Vin reaches rated voltage Vr. When signal RA is deactivated, multiplexer 218 outputs prescribed value RLini as an equivalent resistance command value RL*. When signal RA is activated, multiplexer 218 outputs the output of addition unit 216, that is, the value obtained by adding correction amount ΔRL to prescribed value RLini, as equivalent resistance command value RL*.

Subtraction unit 220 subtracts equivalent resistance RL (actual value) from equivalent resistance command value RL*, and outputs the calculation result to a PI control unit 222 as ΔRL. PI control unit 222 performs proportional and integral calculation using deviation ΔRL calculated by subtraction unit 220 as an input, and outputs the calculation result to a duty calculation unit 224. Duty calculation unit 224 generates signal PWC2 for controlling converter 130 based on the output of PI control unit 222.

Figure 10:
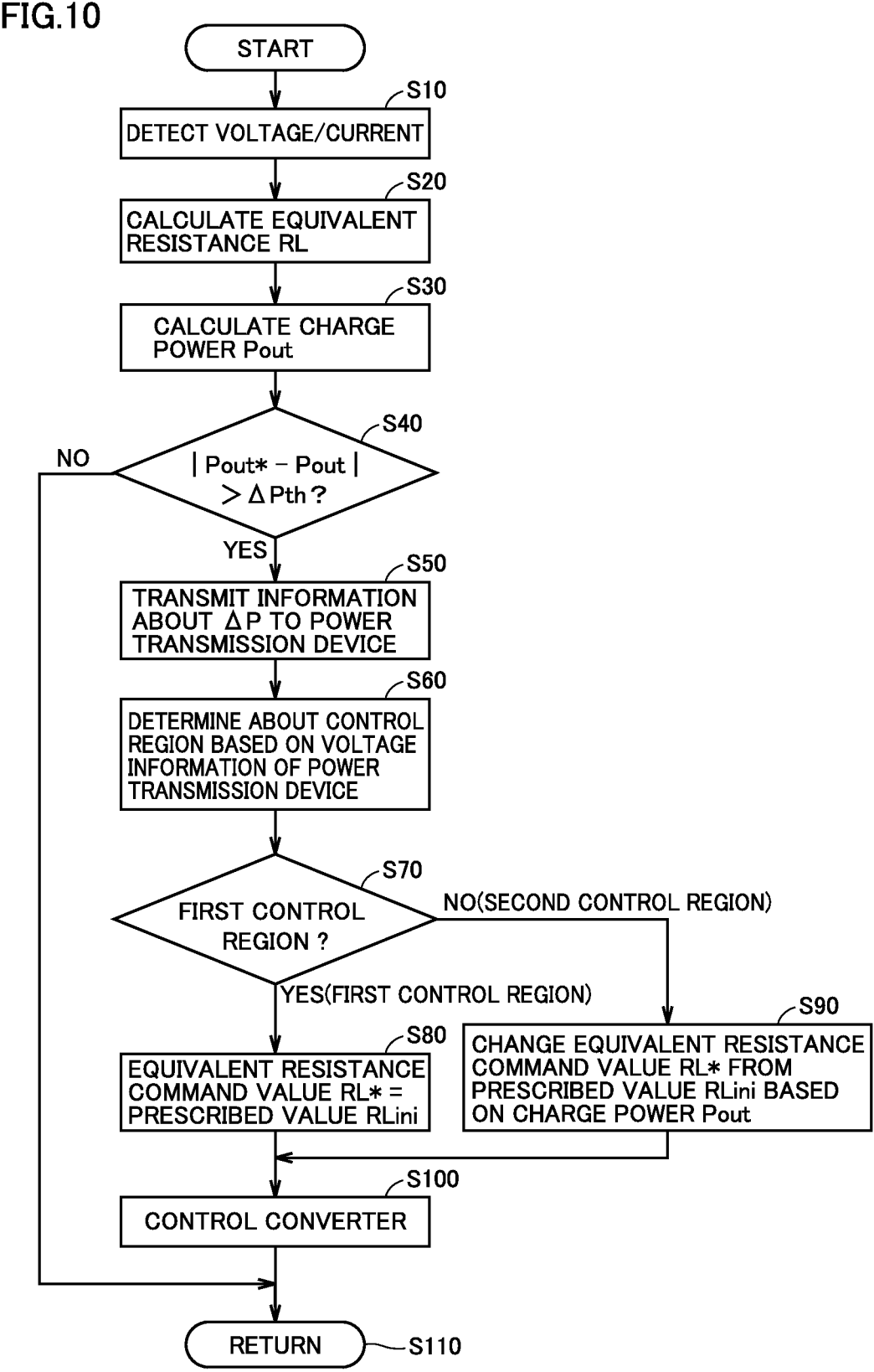
FIG. 10 is a flowchart for illustrating a process procedure of external charging control carried out by the ECU.

FIG. 10 is a flowchart for illustrating a process procedure of external charging control carried out by ECU 150. The process shown in the flowchart is called from a main routine, while external charging is requested, for a certain time period or every time a prescribed condition is satisfied, and then executed.

Referring to FIG. 10, ECU 150 acquires each detected value of voltage sensors 160, 162 and current sensors 164, 166 during execution of external charging (step S10). Then, ECU 150 calculates equivalent resistance RL (actual value) based on each detected value of voltage Vc and current Ic on the input side of converter 130 (step S20). It is to be noted that this equivalent resistance RL is calculated by dividing the detected value of voltage Vc by the detected value of current Ic.

Then, ECU 150 calculates charge power Pout (actual value) based on each detected value of voltage Vb and current Ib (step S30). Then, ECU 150 determines whether or not deviation ΔP between charge power command value Pout* and charge power Pout is larger than a threshold value ΔPth (step S40). When deviation ΔP is equal to or smaller than threshold value ΔPth (No in step S40), ECU 150 causes the process to proceed to step S110 without carrying out a series of subsequent processes.

When it is determined in step S40 that deviation ΔP is larger than threshold value ΔPth (YES in step S40), ECU 150 transmits the information about deviation ΔP to power transmission device 100 by communication device 170 (step S50). Furthermore, based on the voltage information about voltage Vin (at least including the information about whether voltage Vin has reached rated voltage Vr in power transmission device 100) received from power transmission device 100, ECU 150 determines whether coupling coefficient k is included in first control region R1 or in second control region R2 (FIGS. 4 and 5) (step S60).

When voltage Vin has not reached rated voltage Vr and it is determined that coupling coefficient k is included in first control region R1 (the region in which coupling coefficient k is relatively small) (YES in step S70), ECU 150 sets equivalent resistance command value RL* at prescribed value RLini (step S80). On the other hand, when voltage Vin has reached rated voltage Vr and it is determined that coupling coefficient k is included in second control region R2 (the region in which coupling coefficient k is relatively large) (NO in step S70), ECU 150 changes equivalent resistance command value RL* from prescribed value RLini based on charge power Pout (increases equivalent resistance command value RL* in accordance with deviation ΔP) as illustrated in FIG. 9 (step S90).

Then, when equivalent resistance command value RL* is calculated in step S80 or S90, ECU 150 controls converter 130 such that equivalent resistance PL (the input impedance of converter 130) becomes equal to equivalent resistance command value RL* (step S100).

Figure 11:
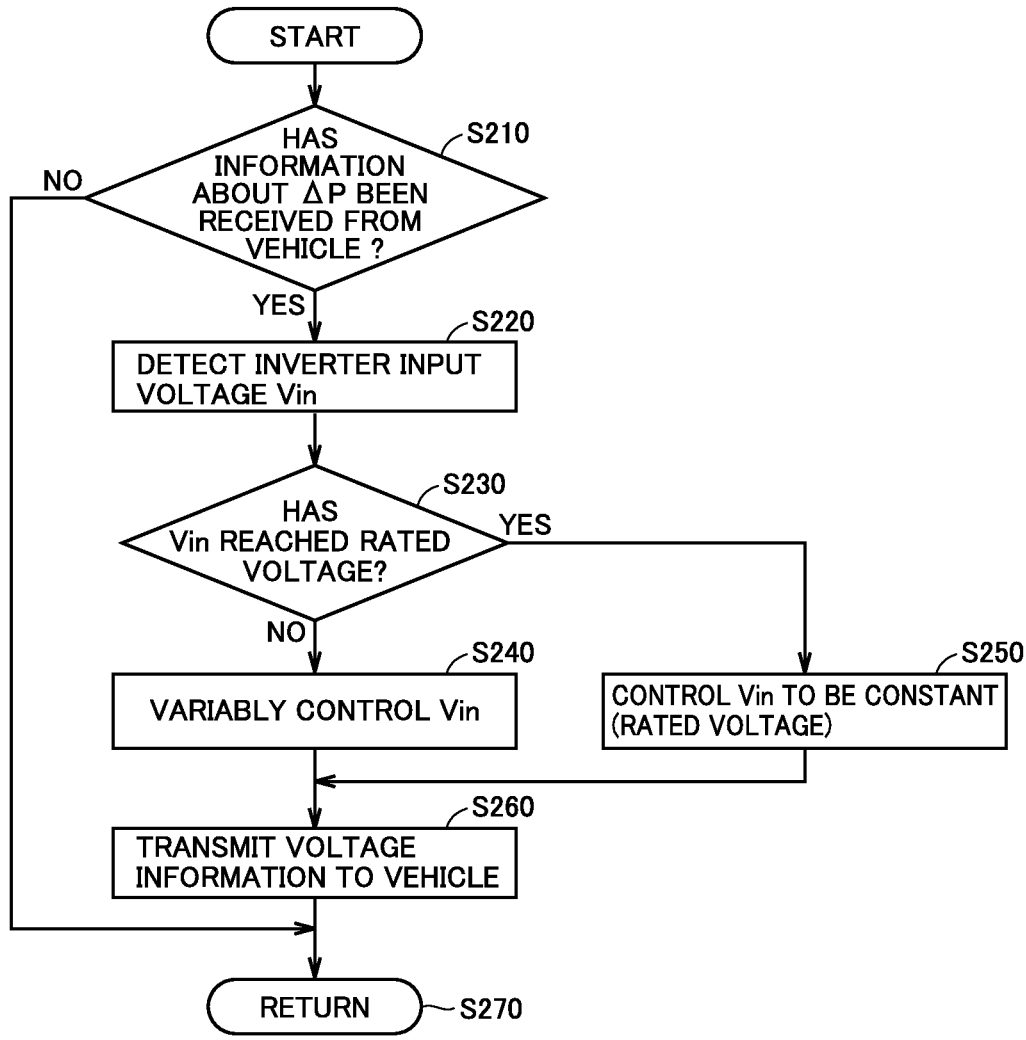
FIG. 11 is a flowchart for illustrating the process procedure of a power supply ECU during external charging control.

FIG. 11 is a flowchart for illustrating the process procedure of power supply ECU 50 during external charging control. The process shown in the flowchart is also called from a main routine, while external charging is requested, for a certain time period or every time a prescribed condition is satisfied, and then executed.

Referring to FIG. 11, power supply ECU 50 determines whether the information about deviation ΔP between charge power command value Pout* and charge power Pout has been received or not from power reception device 200 (step S210). When it is determined that the information about ΔP has not been received (NO in step S210), power supply ECU 50 causes the process to proceed to step S270 without carrying out a series of subsequent processes.

When it is determined in step S210 that the information about ΔP has been received (YES in step S210), power supply ECU 50 receives the detected value of voltage Vin that is an input voltage of inverter 30 (step S220). Then, power supply ECU 50 determines whether voltage Vin has reached rated voltage Vr or not (step S230).

When it is determined that voltage Vin has not reached rated voltage Vr (NO in step S230), power supply ECU 50 carries out voltage variable control for adjusting voltage Vin based on deviation ΔP of the charge power received from power reception device 200 (step S240). It is to be noted that voltage Vin may be increased or decreased in accordance not with the value itself of deviation ΔP but with the symbol of deviation ΔP.

On the other hand, when it is determined in step S230 that voltage Vin has reached rated voltage Vr (YES in step S230), power supply ECU 50 carries out voltage fixing control for maintaining voltage Vin at rated voltage Vr (step S250). Then, power supply ECU 50 transmits, to power reception device 200, the voltage information at least including the information about whether voltage Vin has reached rated voltage Vr or not (step S260).

As described above, in this first embodiment, by dividing external charging control into first control region R1 and second control region R2 in which voltage Vin is maintained at a rating as described above, the minimum voltage of voltage variable high-frequency power supply 15 (the minimum value of voltage Vin) can be raised, as compared with the case where the input impedance of converter 130 is always controlled to be constant. By raising the voltage of voltage variable high-frequency power supply 15, the flowing current is suppressed, thereby suppressing loss. Therefore, according to this first embodiment, it becomes possible to suppress deterioration of the efficiency of the entire system when coupling coefficient k is relatively small.

Furthermore, in the present first embodiment, converter 130 is utilized as an impedance adjuster by adjusting the boosting ratio and the duty of converter 130 provided between rectifier 120 and power storage device 140. Thereby, the increase in number of components mounted in power reception device 200 is suppressed, but the impedance adjuster is not limited to converter 130. For example, a circuit including a capacitor and a coil may be provided separately from converter 130 between power storage device 140 and power reception unit 110. Also, this circuit may be used for adjusting the impedance.

Second Embodiment

This second embodiment is different in circuit configuration of the power reception unit from the above-described first embodiment. Accordingly, this second embodiment is different from the first embodiment in the method of adjusting the equivalent resistance (input impedance) on the vehicle side at the time when voltage Vin has reached rated voltage Vr in power transmission device 100.

The entire configuration of the contactless power transfer system according to the present second embodiment is the same as that in the contactless power transfer system according to the first embodiment shown in FIG. 1.

Figure 12:
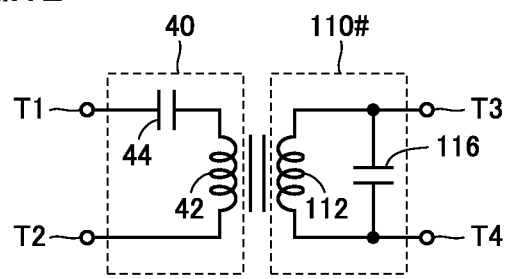
FIG. 12 is a diagram showing the circuit configuration of a power transmission unit and a power reception unit in the second embodiment.

FIG. 12 is a diagram showing the circuit configuration of a power transmission unit 40 and a power reception unit 110# in the second embodiment. Referring to FIG. 12, the circuit configuration of power transmission unit 40 is the same as the configuration of the first embodiment shown in FIG. 2. Power reception unit 110# includes a coil 112 and a capacitor 116. Capacitor 116 is connected in parallel with coil 112 and forms a resonance circuit together with coil 112. Capacitor 116 is provided in order to adjust the resonance frequency of power reception unit 110#. Then, power transmission unit 40 and power reception unit 110# are designed to resonate each other in the transmission frequency of the electric power transmitted from power transmission unit 40 to power reception unit 110. It is preferable that a Q factor showing the resonance strength of power transmission unit 40 and power reception unit 110# is equal to or greater than 100.

In the contactless power transfer system according to the present second embodiment, the so-called the "SP (Series-Parallel) system" configuration is employed, in which capacitor 44 is connected in series to coil 42 in power transmission unit 40 while capacitor 116 is connected in parallel with coil 112 in power reception unit 110#. Such an SP system circuit has ideal transformer characteristics, and serves as a voltage source to a load (the voltage on power reception unit 110# is proportional to the voltage on power transmission unit 40). The following relation lies among voltage Vout of power reception unit 110#, voltage Vin adjusted in power transmission device 100, and coupling coefficient k.

$$Vout = \alpha 2 (Vin/k) \qquad (3)$$

In this case, α2 is a constant. As apparent from the equation (3), when coupling coefficient k is relatively small, voltage Vin needs to be lowered in power transmission device 100 in order to achieve desired voltage Vout in power reception unit 110#. On the other hand, when coupling coefficient k is relatively large, voltage Vin needs to be raised. However, voltage Vin cannot be raised above rated voltage Vr. If voltage Vin is suppressed to the rated voltage even though coupling coefficient k is relatively large, desired voltage Vout may not be able to be achieved.

Figure 13:
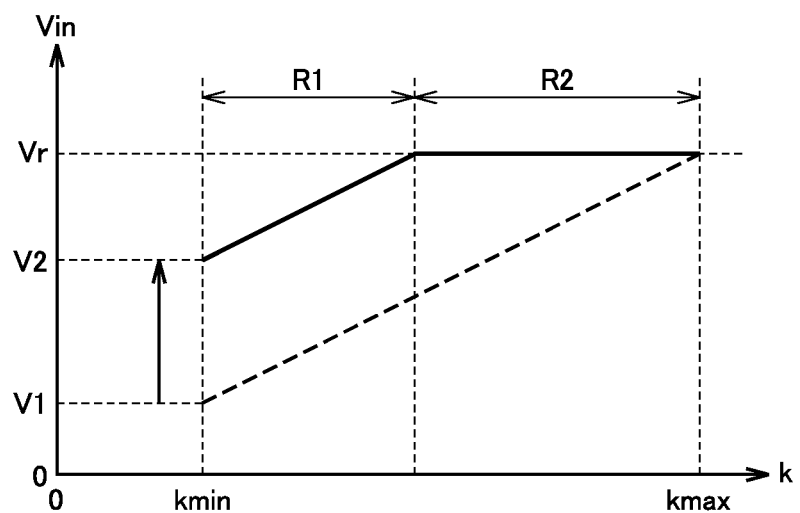
FIG. 13 is a diagram showing the relation between the coupling coefficient and the voltage of the power transmission device in the second embodiment.
Figure 14:
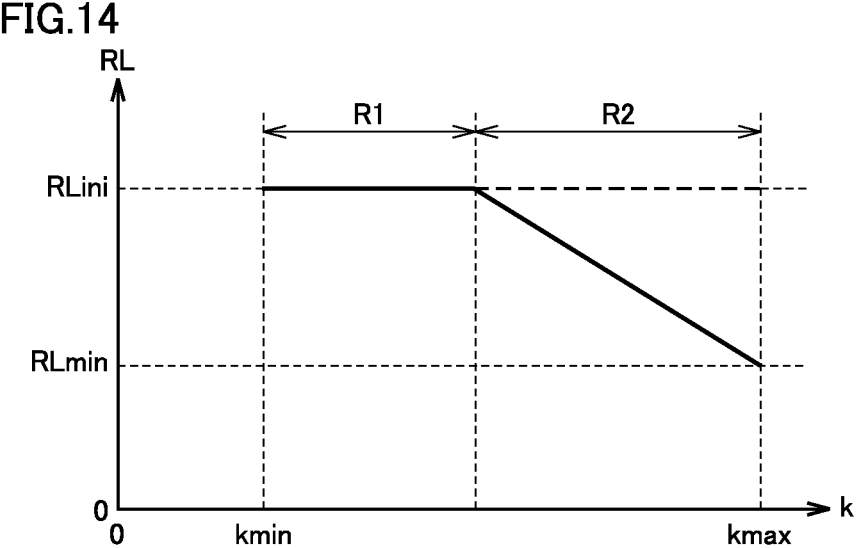
FIG. 14 is a diagram showing the relation between the coupling coefficient and the equivalent resistance in the second embodiment.

FIG. 13 is a diagram showing the relation between coupling coefficient k and voltage Vin of power transmission device 100 in the second embodiment. FIG. 14 is a diagram showing the relation between coupling coefficient k and equivalent resistance RL in the second embodiment. Referring to FIGS. 13 and 14, solid lines show voltage Vin and equivalent resistance RL, respectively, in the contactless power transfer system according to the present second embodiment, while dotted lines show voltage Vin and equivalent resistance RL, respectively, in the conventional system as a reference example.

As in the conventional case (dotted line), if equivalent resistance RL is adjusted to prescribed value RLini without taking coupling coefficient k into consideration (FIG. 14) and voltage Vin is set so as to attain rated voltage Vr when coupling coefficient k is at the maximum, voltage Vin lowers when coupling coefficient k is relatively small, with the result that the flowing current is increased to thereby increase loss.

Accordingly, also in the contactless power transfer system according to the present second embodiment, as in the first embodiment, voltage Vin is increased as compared with the conventional case (the solid line in FIG. 13). Then, voltage Vin can reach rated voltage Vr in a range in which coupling coefficient k is smaller than maximum value kmax. When voltage Vin is limited to rated voltage Vr, voltage Vout lowers in a region where coupling coefficient k is relatively large as apparent from the equation (3). Thus, according to this second embodiment, in second control region R2 where voltage Vin reaches rated voltage Vr, equivalent resistance RL is adjusted by converter 130 such that equivalent resistance RL is decreased as coupling coefficient k is larger (FIG. 14). Specifically, as charge power Pout is expressed by Vout$^2$/RL, equivalent resistance RL is lowered in accordance with the decrease in voltage Vout by suppressing voltage Vin to rated voltage Vr, thereby ensuring desired charge power Pout. By providing such a configuration, voltage Vin can be raised in power transmission device 100 while achieving charge power Pout as indicated by charge power command value Pout*. Consequently, loss in power transmission device 100 can be reduced.

In addition, in this second embodiment, prescribed value RLini of equivalent resistance RL can be determined, for example, based on a lower limit voltage Vbmin of power storage device 140 by the following equation.

$$RLini = Vbmin^2/Pout* \quad (4)$$

Furthermore, minimum value RLmin of equivalent resistance RL obtained when coupling coefficient k reaches maximum value kmax can be determined, for example, based on rated current Ioutr of current Iout in power reception unit 110# by the following equation.

$$RLmin = Pout*/Ioutr^2 \quad (5)$$

By adjusting equivalent resistance RL in this way, current Iout exceeding rated current Ioutr can be prevented from flowing into power reception unit 110#.

In addition, prescribed value RLini may be determined based on equivalent resistance RL at which the maximum transfer efficiency is implemented at the time when coupling coefficient k reaches maximum value kmax.

Figure 15:
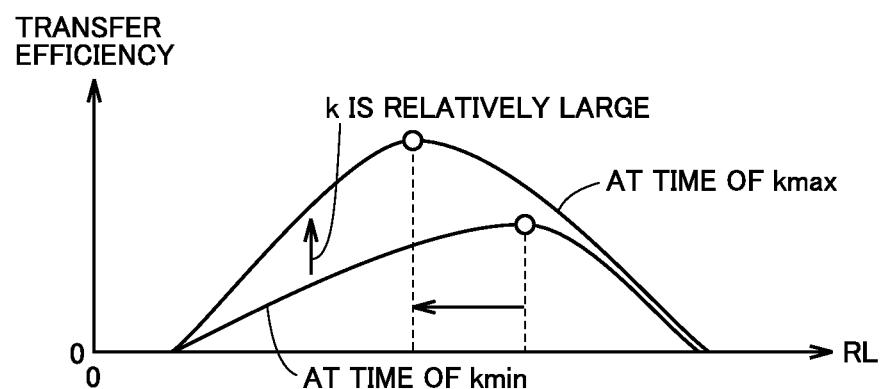
FIG. 15 is a diagram showing the relation between the equivalent resistance and the transfer efficiency from the power transmission unit to the power reception unit.

FIG. 15 is a diagram showing the relation between equivalent resistance RL and transfer efficiency η from power transmission unit 40 to power reception unit 110#. Referring to FIG. 15, also in the SP system, transfer efficiency η is increased as coupling coefficient k is larger. On the other hand, in the SP system, equivalent resistance RL allowing implementation of maximum transfer efficiency η is decreased as coupling coefficient k is larger. Thus, as shown in FIG. 14, in the contactless power transfer system according to this second embodiment, in consideration of the fact that equivalent resistance RL is decreased as coupling coefficient k is larger in region R2, equivalent resistance RL allowing implementation of the maximum transfer efficiency when coupling coefficient k reaches maximum value kmax is set at prescribed value RLini. In this case, in region R2, equivalent resistance RL can be changed such that equivalent resistance RL is decreased below prescribed value RLini as coupling coefficient k is larger.

The configuration of power supply ECU 50 in the second embodiment is the same as that in the first embodiment shown in FIG. 7. Furthermore, the entire configuration of ECU 150 in the second embodiment is also the same as that in the first embodiment shown in FIG. 8.

Figure 16:
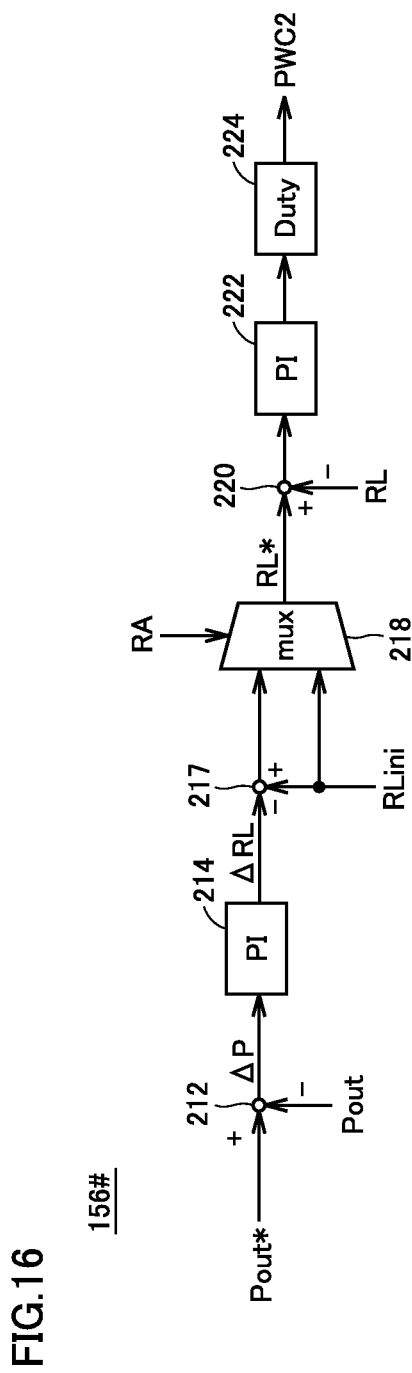
FIG. 16 is a control block diagram of a control unit of an ECU in the second embodiment.

FIG. 16 is a control block diagram of a control unit 156# of ECU 150 in the second embodiment. Referring to FIG. 16, control unit 156# includes a subtraction unit 217 in place of addition unit 216 in the configuration of control unit 156 in the first embodiment shown in FIG. 9. Subtraction unit 217 subtracts a correction amount ΔRL of the equivalent resistance, which is output from PI control unit 214, from prescribed value RLini of the equivalent resistance, and outputs the calculation result to multiplexer 218. Then, when signal RA is activated, multiplexer 218 outputs the output of subtraction unit 217, that is, the value obtained by subtracting correction amount ΔRL from prescribed value RLini, as equivalent resistance command value RL*. Accordingly, adjustment to equivalent resistance RL shown in FIG. 14 can be achieved.

As described above, also in the present second embodiment of the SP system, it becomes possible to suppress deterioration of the efficiency of the entire system when coupling coefficient k is relatively small, as in the case of the first embodiment employing the SS system.

In the above description, power supply ECU 50 corresponds to one embodiment of the "first control unit" in the present invention, and ECU 150 corresponds to one embodiment of the "second control unit" in the present invention. Furthermore, converter 130 corresponds to one embodiment of each of the "impedance adjuster" and the "first converter" in the present invention, and converter 20 corresponds to one embodiment of the "second converter" in the present invention.

Each embodiment disclosed herein is also intended to be combined as appropriate and thereby implemented. It should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A contactless power transfer system comprising:
   a power transmission device; and
   a power reception device,
   said power transmission device including
      a power transmission unit including a power transmission coil and a first capacitor connected in series to said power transmission coil, and configured to transmit electric power to said power reception device in a contactless manner,
      a voltage variable high-frequency power supply configured to supply alternating-current (AC) power to said power transmission unit while adjusting a voltage of the voltage variable high-frequency power supply, and
      a first control unit controlling said voltage variable high-frequency power supply,
   said power reception device including
      a power reception unit including a power reception coil and a second capacitor connected to said power reception coil, and configured to receive electric power from said power transmission unit in a contactless manner,
      an impedance adjuster provided between said power reception unit and load equipment, and
      a second control unit controlling said impedance adjuster,
   said first control unit controlling said voltage variable high-frequency power supply to include a first control region and a second control region, in the first control region the voltage of said voltage variable high-frequency power supply being raised as a coupling coefficient between said power transmission unit and said power reception unit is larger, a coupling coefficient in the second control region being larger than that in the first control region, in the second control region the voltage of said voltage variable high-frequency power supply being maintained at a constant value or substantially at said constant value irrespective of said coupling coefficient, and said second control unit controlling said impedance adjuster such that an input impedance of said impedance adjuster becomes equal to a prescribed value or substantially to said prescribed value when said voltage variable high-frequency power supply is controlled in said first control region, and controlling said impedance adjuster such that received electric power becomes close to a target by changing said input impedance from said prescribed value or substantially from said prescribed value when said voltage variable high-frequency power supply is controlled in said second control region.

2. The contactless power transfer system according to claim 1, wherein said second capacitor is connected in series to said power reception coil, and said second control unit controls said impedance adjuster such that said input impedance becomes greater than said prescribed value when said voltage variable high-frequency power supply is controlled in said second control region.

3. The contactless power transfer system according to claim 1, wherein said second capacitor is connected in parallel with said power reception coil, and said second control unit controls said impedance adjuster such that said input impedance becomes smaller than said prescribed value when said voltage variable high-frequency power supply is controlled in said second control region.

4. The contactless power transfer system according to claim 1, wherein said power reception device further includes a rectifier configured to rectify AC power received by said power reception unit, and said impedance adjuster is a first converter provided between said rectifier and said load equipment.

5. The contactless power transfer system according to claim 1, wherein said prescribed value is set based on a rated current of said power reception device.

6. The contactless power transfer system according to claim 1, wherein said prescribed value is set at an input impedance at which maximum transfer efficiency is implemented when said coupling coefficient is a prescribed minimum value.

7. The contactless power transfer system according to claim 1, wherein said voltage variable high-frequency power supply includes an inverter connected to said power transmission unit, and a second converter configured to adjust an input voltage of said inverter, said first control unit controls said second converter such that said input voltage is raised as said coupling coefficient is larger in said first control region, and controls said second converter such that said input voltage is maintained at a rated voltage of said inverter or substantially at said rated voltage thereof irrespective of said coupling coefficient in said second control region, the voltage of said voltage variable high-frequency power supply is the input voltage of said inverter, and said first control unit maintains the voltage of said voltage variable high-frequency power supply at said constant value or substantially at said constant value by maintaining said input voltage at said rated voltage or substantially at said rated voltage.

* * * * *